UNITED STATES PATENT OFFICE.

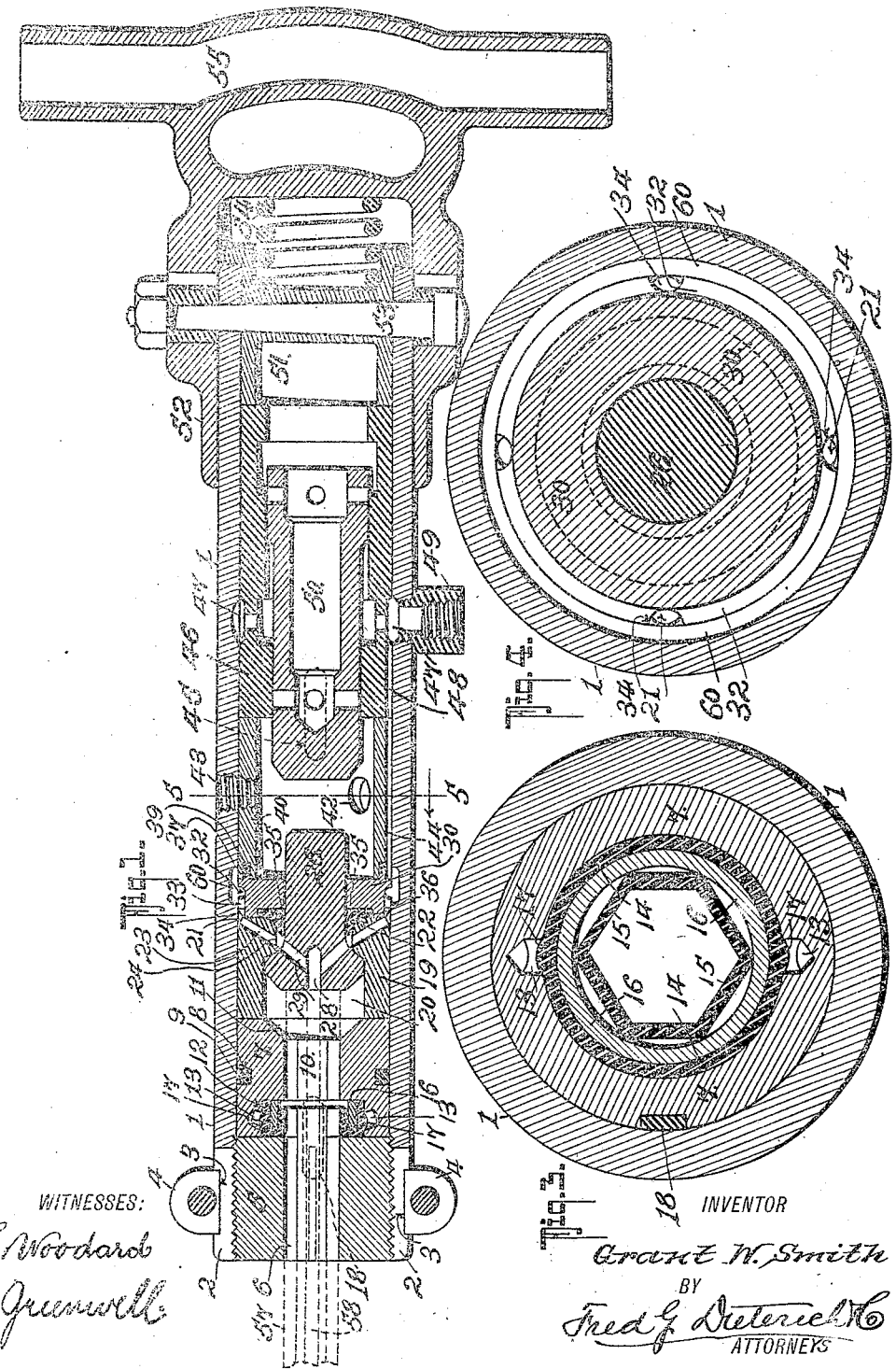

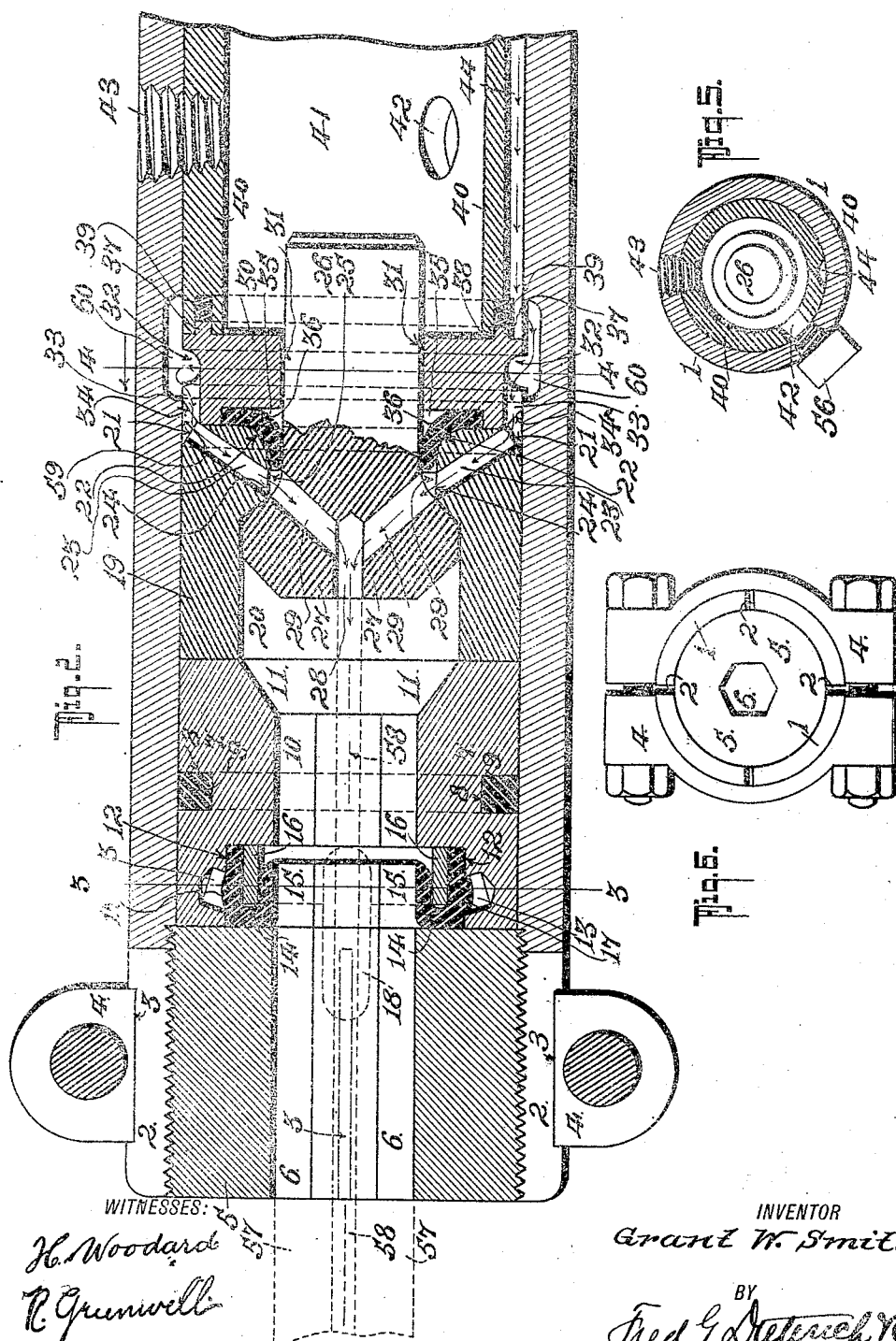

GRANT W. SMITH, OF CHATTANOOGA, TENNESSEE.

ROCK-DRILL.

1,076,246.　　　　Specification of Letters Patent.　　Patented Oct. 21, 1913.

Application filed March 4, 1912.　Serial No. 681,537.

*To all whom it may concern:*

Be it known that I, GRANT W. SMITH, residing at Chattanooga, in the county of Hamilton and State of Tennessee, have invented new and useful Improvements in Rock-Drills, of which the following is a specification.

My invention relates to certain new and useful improvements in rock drills of the reciprocating hammer piston type. In drilling engines of this type, the drill is held in the chuck end of the apparatus and is impacted to force the drill to cut. In cutting stone in the manner stated some means must be provided for blowing out the dust or chips, or cleaning the hole as it is being drilled. Attempts have heretofore been frequently made to accomplish this act by forcing the compressed air, water or other fluid into the hole (usually through the drill) while the drilling operation is taking place.

One of the objects of my invention, therefore, is to provide a drilling engine in which adequate provision is made for sealing the drill in the chuck end of the machine and maintaining the joints of the machine tight to prevent leakage and consequent waste of the fluid used to blow out the dirt.

Another object of the invention is to simplify and reduce the cost of production and maintenance of the drilling engine, and to so design and construct a device of this character that should one or more of the parts thereof become worn or broken the same may be replaced with little or no effort or delay.

A further object of the invention is to provide means for sealing the tappet plug in its bearing to prevent leakage of fluid around the same when the parts are in operation.

More specifically, the invention, in addition to providing means for accomplishing the foregoing objects also includes those novel details of construction, combination and arrangement of parts, all of which will be first fully described and then be specifically pointed out in the appended claims, reference being had to the accompanying drawings, in which:—

Figure 1 is a central, vertical, longitudinal section of the complete drilling mechanism. Fig. 2 is a full size detail vertical longitudinal section of a portion of the drilling engine showing those parts which principally constitute the present invention. Figs. 3 and 4 are cross sections on the lines 3—3 and 4—4 respectively of Fig. 2, looking in the direction of the arrows. Fig. 5 is a cross section on the line 5—5 of Fig. 1, and Fig. 6 is a front elevation of the drilling engine.

In the drawings in which like numerals and letters of reference designate like parts in all the figures, 1 is the barrel of the drill, the front end of which is longitudinally slotted, as at 2, and circumferentially grooved, as at 3. 4 is a clamp which sets in the groove 3, and is adapted to force the slotted or split end of the barrel 1, to grip the end plug 5, which is threaded into the slotted end of the barrel 1, and coöperating with the sealing plug 7, acts as the chuck for receiving the drill 57, as indicated in dotted lines in Figs. 1 and 2.

The plug 5 is rigidly held in place through the action of the clamp 4, so as to prevent turning of the same, and it is provided with a hexagonal bore 6, to receive the correspondingly shaped drill 57.

The plug 7, which for convenience I term the sealing plug, has a bore 10 corresponding with and forming a continuation of the bore 6, of the plug 5, and it also has an annular groove 8, in which a suitable packing 9, is located, to prevent escape of air past the plug 7 in the barrel 1. The plug 7 has at its inner end an enlarged counter bore 11, and at its outer end it has a counter bore 12, with which one or more approximately radial bores 13, communicate. The bore 12 forms a pocket to receive the sealing washer 14 and sustaining ring 16.

The washer 14 is preferably constructed of leather or other suitable material, and formed as best indicated in Fig. 2 of the drawings, the same having a passage 15 of corresponding form, and forming a continuation of the passage 6, the passage 15 being located between the passages 6 and 10. In practice, the washer 14 will swell at 17, into the bores 13, so as to hold the washer 14 from turning and thereby maintain the hexagonal passage 15 in alinement with the correspondingly shaped passages 6 and 10.

In order to hold the plugs 5 and 7 from turning with relation to one another, they are keyed together, as at 18.

19 designates a third plug which coöperates with the bearing plug 30 to form the tappet holder and guide.

The plug 19 has a passage through the same of two diameters, the larger portion of the bore forming the tappet head chamber 20, and the narrower portion 24 thereof, serving to permit the projection of the shank 24 of the tappet, and also serving to receive the tappet sealing washer 36, which is secured between the plugs 19 and 30, and it rests in the counter bore 35, of the tappet bearing plug 30. Where they abut, the plugs 19 and 30 are beveled off at 21 and 34 to form a V-shaped annular chamber within the barrel 1. The washer receiving entrance portion of the plug 19 is rounded, as at 22, and it will be observed best by reference to Fig. 2, the washer 36 does not extend the full length of the bore 24, of the plug 19, but is so designed as to leave a space 25 around the tappet 26. The space 25 is maintained in communication with the V-shaped annular chamber 59 between the plugs 19 and 30, by bores 23 in the plug 19, while the tappet 26 is provided with bores 29 in its head 27, that effect communication between the space 25 and the axial recess 28 of the tappet 26, which communicates with the longitudinal hole or bore 58 of the drill 57.

The bearing plug 30 is bored at 31 to snugly receive the shank of the tappet 26 to form a bearing for the same, it being understood that the enlarged bore forming the chamber 20, of the plug 19, serves as a bearing for the tappet head 27. The bearing plug 30 has a circumferential annular groove 32 that communicates with the V-shaped annular chamber 59, through the medium of the longitudinal grooves 33. On its rear wall, the bearing plug 30 has an annular rim-like lug 37 that projects into the correspondingly formed groove 38, of the exhaust chamber sleeve 40, packing 39 being held in the groove 38 to prevent escape of air between the sleeve 40 and the bearing plug 30. The sleeve 40 is held in place by a stud 43 and forms the exhaust chamber 41 hereinafter again referred to. The sleeve 40 and the barrel 1 are provided with an exhaust port 42 that delivers into the exhaust nipple 56, see Figs. 2 and 5. The sleeve 40 is also provided with an outer longitudinal groove 44 for conveying air or other scavenging fluid to the internal annular groove 60 of the barrel 1, from which the air passes into the groove 32, and through the grooves 33 into the chamber 59 from whence it is conducted through the ports 23, 29 and 28 into the drill bore 58.

46 is the hammer piston bearing sleeve which is keyed at 45 to the sleeve 40 and which contains the usual bores and grooves for coöperating with the hammer piston 50.

49 is the working agent inlet nipple which delivers into the annular groove 47 of the barrel 1, that in turn communicates with the interior of the sleeve 46 to act on the hammer piston 50, and the sleeve 46 has an outer longitudinal groove portion 48 for effecting communication between the groove 47 and the groove 44, whereby the working agent is conducted to the groove 44. As the construction of the hammer piston 50 and its sleeve 47 forms, *per se*, no part of the present invention, but is of the ordinary construction, a detail description thereof is thought to be unnecessary.

51 is the closure plug for the rear end of the barrel 1, and 52 is the handle socket member into which the barrel 1, projects.

54 is the recoil spring, and 55 is the hand grip portion of the handle member.

53 is the bolt which secures the plug 51 to the barrel 1 and holds the handle in place. The construction of the handle mechanism also forms no part of the present invention and a further detail description thereof is thought to be unnecessary.

In the practical operation of the invention, the drill 57 is inserted as indicated in dotted lines in Figs. 1 and 2 until the end of the drill engages the head 27 of the tappet 26. Working agent is then admitted into the groove 47 through the nipple 49 and the piston 50 is caused to reciprocate. Working agent also passes from the groove 47 via the grooves 48, 44, 60, 32, 33, 59, and the bores 23, 29, and 28, into the bore 58, of the drill by which it is conducted to the cut to blow out the debris.

When the parts are in operation, the live air in the space 25 will assist in holding the packing or washer 36 in tight contact with the tappet 26 and thereby prevent leakage of the air into the exhaust chamber 41, and should any air pass around the inner end of the drill 57 through the bore 10, it will enter the packing chamber 12 and assist in forcing the packing 14 in tight contact with the drill, and thereby prevent the escape of air around the drill through the passage 6, in the plug 5. Any air that would leak between the plugs 7 and 19 and attempt to pass through the barrel 1 to the outer end, will be checked by the packing 9 and similarly the packing 39 will prevent the leakage of the air between the groove 60 and the interior of the exhaust chamber 41.

From the foregoing description, taken in connection with the accompanying drawings, it is thought the complete construction, operation and advantages of the invention will be apparent to those skilled in the art, and I desire to say, I do not wish to be limited to the specific details of construction shown and described, as it is obvious that numerous changes may be made in the details of construction and arrangement of parts without departing from the spirit of the invention, and furthermore with little or no change the machine may be made to operate, not only with compressed air which is the preferable medium, but with steam or other suitable fluid.

What I claim is:—

1. In a drilling apparatus, a barrel, a drill holding chuck carried thereby, said chuck having a drill receiving bore and a chamber in communication with said bore, and means within said chamber for sealing off the escape of fluid through the chuck around the drill, said means comprising a flexible packing having a drill passage, and means holding the packing in said chamber, said packing being spaced from said holding means to leave fluid receiving pockets to receive the leaking fluid under pressure and thereby press said packing into tight sealing contact with the drill.

2. In a drilling apparatus, a barrel, a hammer piston sleeve and a hammer piston within said barrel, means for leading working fluid to said sleeve and piston to reciprocate said piston; said barrel having an exhaust chamber and an exhaust port communicating with the exhaust chamber, a tappet carrier forming a partition in said barrel to close the front end of said exhaust chamber, a tappet carried by said carrier and projecting into said exhaust chamber, a drill chuck in said barrel, said tappet having a bore to deliver into the drill and means for delivering fluid under pressure to said tappet bore.

3. In a drilling apparatus, a barrel, a hammer piston sleeve and a hammer piston within said barrel, means for leading working fluid to said sleeve and piston to reciprocate said piston; said barrel having an exhaust chamber and an exhaust port communicating with the exhaust chamber, a tappet carrier forming a partition in said barrel to close the front end of said exhaust chamber, a tappet carried by said carrier and projecting into said exhaust chamber, a drill chuck in said barrel, said tappet having a bore to deliver into the drill and means for delivering fluid under pressure to said tappet bore, and means for sealing off the escape of fluid around said tappet between said tappet bore and the exhaust chamber.

4. In a drilling apparatus, a barrel, a hammer piston sleeve and a hammer piston within said barrel, means for leading working fluid to said sleeve and piston to reciprocate said piston; said barrel having an exhaust chamber and an exhaust port communicating with the exhaust chamber, a tappet carrier forming a partition in said barrel to close the front end of said exhaust chamber, a tappet carried by said carrier and projecting into said exhaust chamber, a drill chuck in said barrel, said tappet having a bore to deliver into the drill and means for delivering fluid under pressure to said tappet bore, and means for sealing off the escape of fluid around said tappet between said tappet bore and the exhaust chamber, and means for sealing off the escape of fluid through said chuck around said drill.

5. In a drilling apparatus, a barrel, a hammer piston sleeve and a hammer piston within said barrel, means for leading working fluid to said sleeve and piston to reciprocate said piston; said barrel having an exhaust chamber and an exhaust port communicating with the exhaust chamber, a tappet carrier forming a partition in said barrel to close the front end of said exhaust chamber, a tappet carried by said carrier and projecting into said exhaust chamber, a drill chuck in said barrel, said tappet having a bore to deliver into the drill and means for delivering fluid under pressure to said tappet bore, and means for sealing off fluid through said chuck around said drill.

6. In a drilling apparatus, a barrel, a hammer piston sleeve and a hammer piston within said barrel, means for leading working fluid to said sleeve and piston to reciprocate said piston; said barrel having an exhaust chamber and an exhaust port communicating with the exhaust chamber, a tappet carrier forming a partition in said barrel to close the front end of said exhaust chamber, a tappet carried by said carrier and projecting into said exhaust chamber, a drill chuck in said barrel, said tappet having a bore to deliver into the drill and means for delivering fluid under pressure to said tappet bore, and means for sealing off the escape of fluid around said tappet between said tappet bore and the exhaust chamber, said last named means including a packing carried by said carrier and located between said exhaust chamber and the place of fluid delivery into said tappet bore whereby the fluid under pressure will hold the packing in sealing contact with said tappet.

7. In a drilling apparatus, a barrel, a hammer piston operating in said barrel, means for delivering working fluid to said hammer piston, said barrel including an exhaust chamber, a tappet carrier mounted in said barrel in front of said exhaust chamber, a tappet operating in said carrier and entering into said exhaust chamber, said tappet carrier comprising two members, said tappet having a head and a shank, one of said members having a bore to receive said shank and the other member having a bore to receive said head and permit passage of said shank, said other member bore being of greater diameter than the tappet shank, a packing supported by said members and projecting into said other member shank bore to encircle said tappet shank, and means for delivering fluid under pressure into said other member bore around said tappet shank between said packing and said tappet head to hold said packing in tight engagement with said tappet shank.

8. In a drilling apparatus, a barrel, a hammer piston operating in said barrel, means for delivering working fluid to said hammer piston, said barrel including an exhaust chamber, a tappet carrier mounted in said barrel in front of said exhaust chamber, a tappet operating in said carrier and entering into said exhaust chamber, said tappet carrier comprising two members, said tappet having a head and a shank, one of said members having a bore to receive said shank and the other member having a bore to receive said head and permit passage of said shank, said other member bore being of greater diameter than the tappet shank, a packing supported by said members and projecting into said other member shank bore to encircle said tappet shank, and means for delivering fluid under pressure into said other member bore around said tappet shank between said packing and said tappet head to hold said packing in tight engagement with said tappet shank, said tappet having passages communicating with said other member bore to deliver the fluid under pressure to the drill, and a drill chuck carried by said barrel for holding the drill in alinement with said tappet.

9. In a drilling apparatus, a barrel, a drill chuck held in said barrel and consisting of two plug like members, one of said members forming an outer closure plug for said barrel, means for securing said outer closure plug rigidly in position in said barrel, said chuck members having a drill passage through the same, one of said chuck members having a chamber in communication with said drill passage, a packing medium in said chamber for sealing off the escape of fluid around said drill, means for locking said chuck members together to prevent relative turning movement of the same, a tappet carrier mounted in said barrel adjacent to said chuck members, a tappet carried by said tappet carrier, said tappet carrier having a chamber in communication with the drill bore of said chuck members, said barrel having an exhaust chamber into which said tappet projects, means for delivering fluid under pressure into said tappet chamber, around said tappet and through said tappet into the drill, and means for sealing off the escape of fluid under pressure from said tappet chamber into said exhaust chamber, and a hammer piston operatively mounted in said barrel to exhaust into said exhaust chamber, and means for delivering working fluid to said piston to operate the same.

10. In a drilling apparatus, a barrel, a drill holding chuck mounted in said barrel and including two members, one of said members being freely fitted into the barrel, and having an annular packing ring to prevent leakage between the same and the barrel, means in said barrel forming a stop against which said packing ring carrying member rests, the other chuck member comprising a body threaded and clamped into the barrel to abut the first mentioned chuck member, each of said chuck members having a hexagonal drill receiving bore, one of said chuck members having an annular counterbore at one end, a packing member of U-shape in cross section fitted into said counterbore, one part of said packing member being annular to lie against the annular wall of said counterbore, and the other part of said packing member being hexagonal to fit the drill, substantially as shown and described.

11. In a drilling apparatus, a barrel, a drill holding chuck mounted in said barrel and including two members, one of said members being freely fitted into the barrel, and having an annular packing ring to prevent leakage between the same and the barrel, means in said barrel forming a stop against which said packing ring carrying member rests, the other chuck member comprising a body threaded and clamped into the barrel to abut the first mentioned chuck member, each of said chuck members having a hexagonal drill receiving bore, one of said chuck members having an annular counterbore at one end, a packing member of U-shape in cross section fitted into said counterbore, one part of said packing member being annular to lie against the annular wall of said counterbore, and the other part of said packing member being hexagonal to fit the drill, said counterbored chuck member having indentations merging with the counterbore into which said packing member is adapted to swell and form retaining knobs to prevent turning of the packing member in the counterbore.

12. In a drilling apparatus, a barrel, a drill holding chuck mounted in said barrel and including two members, one of said members being freely fitted into the barrel, and having an annular packing ring to prevent leakage between the same and the barrel, means in said barrel forming a stop against which said packing ring carrying member rests, the other chuck member comprising a body threaded and clamped into the barrel to abut the first mentioned chuck member, each of said chuck members having a hexagonal drill receiving bore, one of said chuck members having an annular counterbore at one end, a packing member of U-shape in cross section fitted into said counterbore, one part of said packing member being annular to lie against the annular wall of said counterbore, and the other part of said packing member being hexagonal to fit the drill, said counterbored chuck member having indentations merging with the counterbore into which said packing member is adapted to swell and form retaining knobs to prevent turning of the packing member in the counterbore, and an annular retaining ring held within said packing member, the internal surface of said ring coöperating with the hexagonal portion of said packing member to form fluid pockets into which the leaking fluid is adapted to pass to press the hexagonal portion of said packing member into tight sealing contact with the drill.

GRANT W. SMITH.

Witnesses:
PAUL CAMPBELL,
CHAS. S. COFFEY.